Jan. 5, 1965     W. A. BISHMAN ETAL     3,164,197
TIRE TOOL
Filed May 10, 1963     2 Sheets-Sheet 1
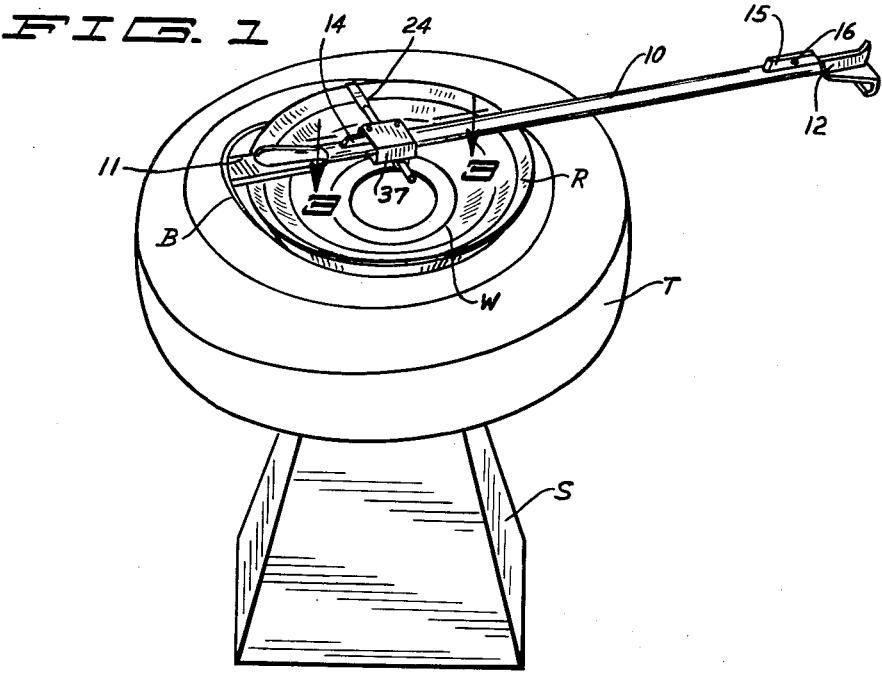
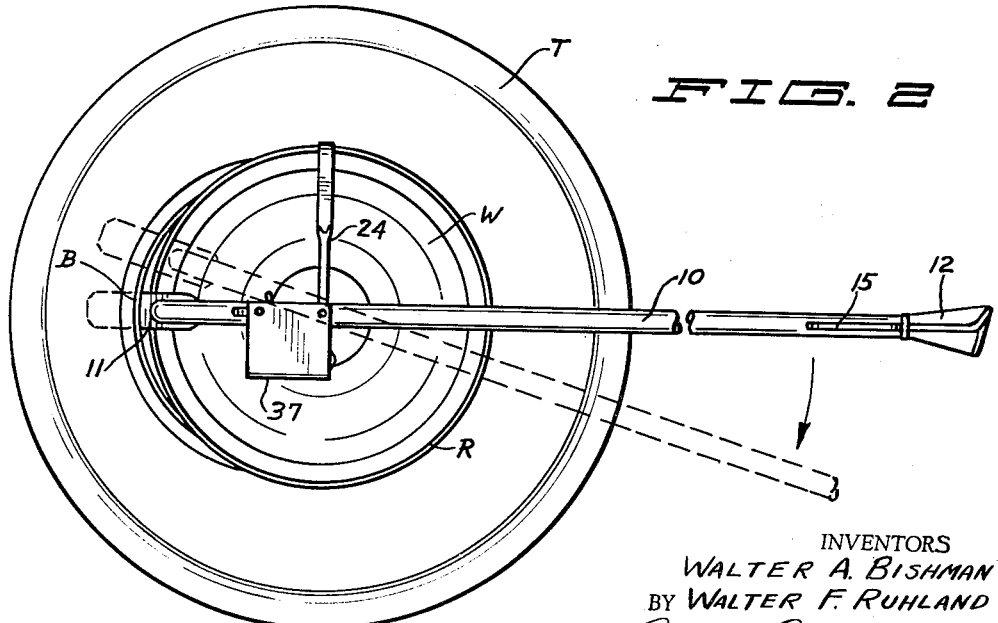
INVENTORS
WALTER A. BISHMAN
BY WALTER F. RUHLAND
Carlsen, Carlsen & Sturm
ATTORNEYS

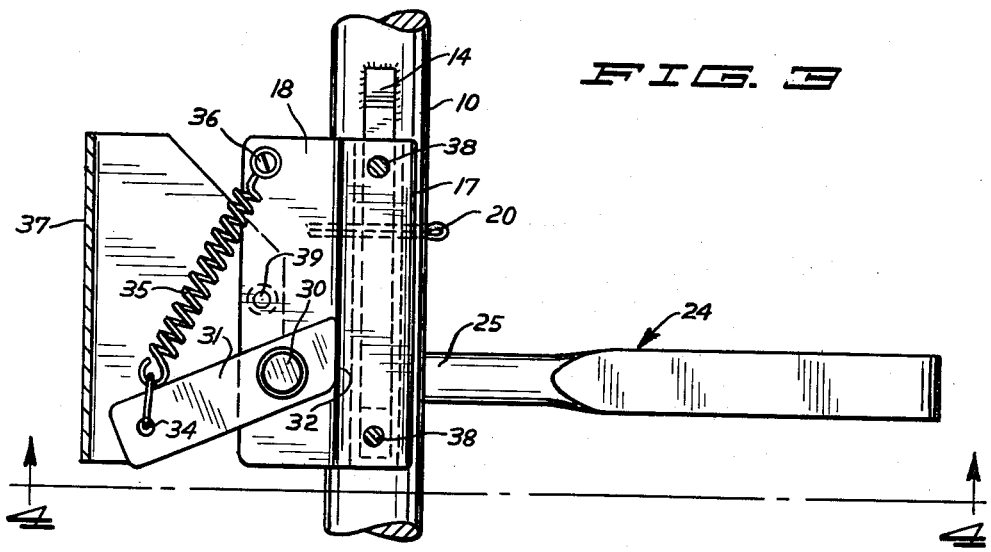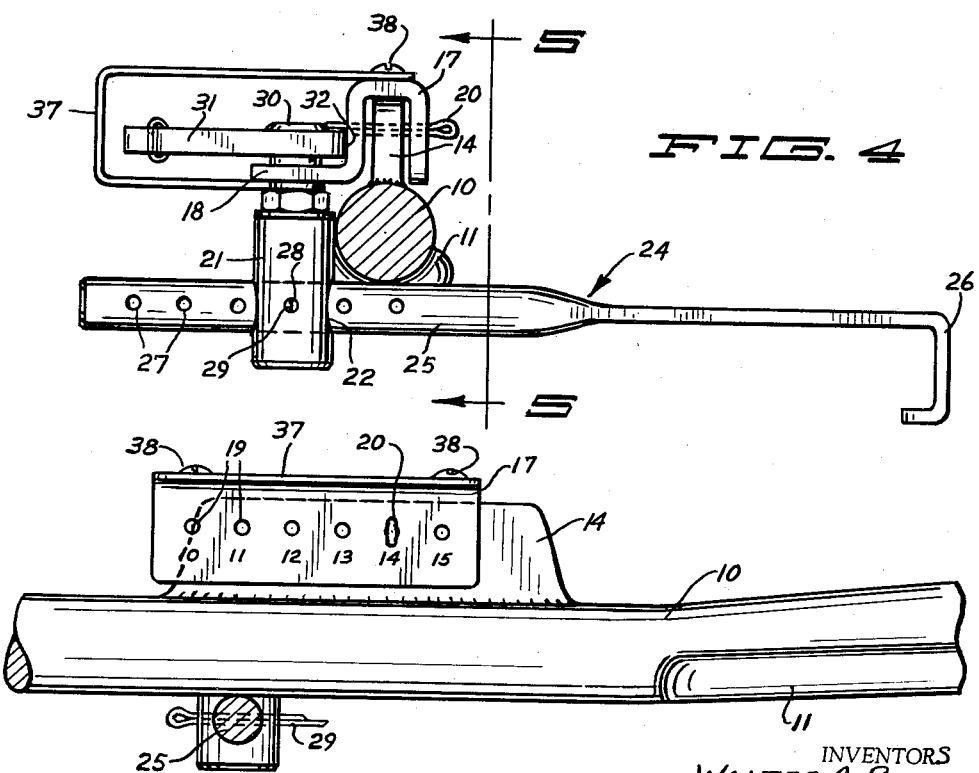

3,164,197
TIRE TOOL
Walter A. Bishman, Minneapolis, and Walter F. Ruhland, Shakopee, Minn., assignors to Bishman Manufacturing Company, Osseo, Minn., a corporation of Minnesota
Filed May 10, 1963, Ser. No. 279,510
3 Claims. (Cl. 157—1.3)

This invention relates to tools for mounting or dismounting vehicle tires relative to their carrying wheel. A common form of tire mounting and demounting apparatus includes a wheel holding chuck having a spindle extending through the center opening in the wheel. One end of an elongated tool bar is then utilized to urge the tire bead over the wheel rim by using the spindle as a fulcrum for the tool. Many vehicle wheels in present day use, however, do not lend themselves to use with such apparatus because of the fact that they have no center opening or such opening is too small to receive a spindle of adequate size to withstand the pressures involved. The present invention is concerned primarily with tire mounting and dismounting with respect to such wheels.

The primary object of the invention is to provide a tool for tire mounting or dismounting with respect to a wheel having no center opening.

Another and more specific object of the invention is to provide a tire mounting and dismounting device having a tool bar having a work portion adapted to be moved progressively around the tire in engagement with the bead thereof and with the tool providing its own fulcrum or pivot point for such movement.

With these objects in view the invention broadly comprises an elongated bar having a work head at one end for working engagement with the bear of a tire mounted on a wheel rim, a bracket mounted on the bar adjacent the work head, a tension arm pivoted on the bracket and extending laterally from the bar and having a hook at its extended end for engaging the wheel rim, and spring means interconnecting the bracket and tension arm to yieldably retain the arm in a position extending substantially at right angles to the bar. The tool is further characterized by providing for adjustment of the bracket along the bar and adjustment of the extension length of the arm to enable the tool to be used on wheels of different diameters.

The above mentioned and still additional objects of the invention will be brought to light during the course of the following specification, reference being made to the accompanying drawings, in which—

FIG. 1 is a perspective view of a wheel mounted in a tire changer chuck with the tool applied thereto for performing the tire dismounting operation.

FIG. 2 is a plan view of the tool in the working position shown in FIG. 2 and with the next succeeding position of the tool during the tire removal operation shown in FIG. 2.

FIG. 3 is an enlarged fragmentary horizontal section through the pivot box of the tool taken on line 3—3 of FIG. 1 and looking downwardly.

FIG. 4 is a vertical section through the tool bar taken on line 4—4 of FIG. 3.

FIG. 5 is a vertical section taken on line 5—5 of FIG. 4 and showing the pivot box and a portion of the tool bar in elevation.

Referring now more particularly to the drawings, reference characters will be used to denote like parts or structural features in the different views. In use of the tool the wheel W having a peripheral outer rim R is securely locked, in conventional manner, in a chuck (not shown) mounted at the top of a base support S. The wheel mounted tire T, having an annular bead B, is shown mounted on the support S. While the tool herein disclosed may serve its intended functions on all types of vehicle wheels, it is particularly designed for wheels which do not have a center opening allowing the penetration of a spindle through the wheel.

In conventional construction the automobile wheel is provided with a peripheral outwardly opening channel or well into which the tire beads are "broken" by inward collapse thus loosening the tire on the wheel. The bead B is then pried over the rim R progressively around the rim to remove the tire from the wheel for repair or replacement.

The tool has as its main component an elongated bar 10. This bar is provided at one end with a conventional demount head adapted to extend under the tire bead B and lift or pry the bead over the rim as it is moved around the rim. At the opposite end the bar is provided with a tire mounting head 12 designed to push the bead down over the rim as it is moved therearound. Identical mounting lugs 14 and 15, each provided with an aperture 16, are integrally secured on the bar respectively adjacent the heads 11 and 12 for the purpose of mounting the tension arm assembly now to be described.

An elongated channel-shaped bracket 17 having a lateral flange 18 (FIGS. 3 and 4) is adapted for detachable mounting on either of the lugs 14 or 15. The opposing side walls of the bracket 17 are each provided with a series of apertures 19 (FIG. 5) with each aperture 19 aligned transversely of the bracket with a corresponding aperture in the opposing wall. The apertures 16 and 19 are adapted to receive pin 20 thus allowing the bracket to be fixedly mounted at various positions longitudinally along the mounting lug. Accordingly, bracket 17 may be mounted at various positions of adjustment with respect to the head 11.

Flange 18 has an opening therethrough and an arm support element 21 is journaled in said opening for rotation on an axis perpendicular to the bar 10. The main body of element 21 is disposed below the flange 18 and is provided with passage 22 below the bar 10, said passage extending perpendicular to the axis of rotation of the element. A tension arm 24 has handle portion 25 and extended hook portion 26 adapted to engage over and grip the marginal edge of a wheel rim such as denoted at R. The handle portion is adapted for a sliding fit in passage 22 of the element 21 and is provided with a row of aligned pin receiving apertures 27. Element 21 is also provided with an aperture 28 extending crosswise of the passage 22 and adapted to align with any selected aperture 27. Pin 29 is inserted through the aperture 28 and the selected handle aperture 27 to hold the arm 24 in any desired position of extension.

The upper end portion 30 of the element 21 above the flange 18 has a lever arm 31 fixedly mounted thereon and extending outwardly in a direction generally opposite to that of the arm 24. The inner end of arm 31 has a stop surface 32 engageable with the wall of channel 17 to limit movement of the arm and member 21 in one direction about their turning axis. The extended end of the arm 31 is apertured as at 34 for connection of one end of the tension spiral spring 35, the opposite or forward end of which is anchored as at 36 to the flange 18. With spring 35 under constant tension, the arm stop edge 32 is held against the channel 17 and the arm 24 is yieldably held in a position extending at right angles to the bar 10, as shown in FIG. 3.

A U-shaped guard denoted at 37 has its leg plates respectively secured to the channel 17 as by screws 38 and to the flange 18 as by screw 39 to jointly with the member 17 form a partial enclosure for the members 31 and 35 which might be referred to as a "pivot box."

The entire assembly comprising the members 17, 21, 24, 31 and 37 which is detachable from the bar 10 by means of pin 20 may for convenience be referred to as the "tension arm assembly."

Operation of the tool will now be described. Assuming that the tool is to be used for dismounting the tire T from the wheel W, the tension arm assembly is mounted on bar 10 as shown adjacent the demount head 11 of the bar. The position of mounting of the channel 17 along lug 14 is governed by the diameter of the wheel being worked upon, with the pin 20 being inserted through the apertures 19 and 16 giving the head 11 the desired distance of extension beyond the pivot box. Similarly, the arm 24 is longitudinally adjusted to proper position in the element 21 prior to insertion of pin 29 into the apertures 27 and 28. Both adjustments are made as to have the bar 10 and arm 24 intersect at substantially the center of the wheel when head 11 is properly engaged under the tire bead and hook 26 is engaged with rim R as shown in FIGS. 1 and 2.

The tire beads are "broken" into the rim well and the wheel securely mounted on the support S prior to application of the tool. The head 11 is then inserted under the bead B and hook 26 engaged over the rim as shown. With the tool in the initial position of FIG. 2, the bar 10 is manually swung in the direction indicated by the arrow in that figure, such movement taking place about the axis of element 21, which is held in place by the tension arm 24. Such movement will take place against the tension of spring 35 and separate the edge 32 of stop arm 31 from its flush engagement with the channel 17. With such swinging movement of the bar 10, the head 11 thereof will move along under the tire bead B lifting it over the wheel rim. When it has been moved a short distance, such as to the position shown in broken lines (FIG. 2), the swinging movement is stopped and with the release of swinging pressure the tension will be relieved from arm 24 and it will be advanced along the rim by spring 35 to again resume a right angular position with respect to bar 10. This allows the movement just described to be repeated and succeeding similar movements of the bar 10 are made until the bead B has been completely removed from the rim. It will be readily understood that an experienced operator by intermittently applying and releasing swinging pressure on the bar 10 can remove the tire in a matter of seconds.

The operation is similar where it is desired to force the bead onto the rim only here the tension arm assembly is mounted on lug 15 and the mounting head 12 is moved in successive steps about the wheel to push the tire bead downwardly over the rim.

The tool as disclosed accordingly provides an economical and effective means of carrying out the aforementioned objectives. It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a tire tool for moving a tire bead relative to the rim of a wheel on which the tire is mounted, an elongated tool bar having a work portion at one end for engagement with the tire bead, a pivot bracket, means for mounting said bracket in fixed position on the tool bar adjacent said work portion, a tension arm having a hook portion at one end for gripping engagement with the wheel rim, the other end of said arm being pivotally connected to the bracket on an axis perpendicular to the bar, said arm extending laterally from the bar and movable about said axis between a rest position at substantial right angles to the bar and forward position toward the work portion of the bar, and spring means acting between the arm and bracket to yieldably retain the arm in its rest position.

2. The subject matter of claim 1 wherein said bracket mounting means includes means for mounting the bracket at various fixed positions along the tool bar and said pivotal connection includes means for adjusting the same longitudinally of the tension arm to enable the tool to be adjusted to accommodate various sizes of wheels.

3. In a tire tool for moving a tire bead over the rim of a wheel, an elongated tool bar having a work head at one end for engagement with the tire bead, a bracket, means for adjustably mounting the bracket on the tool bar adjacent to but spaced from the work head, an arm support element pivoted to the bracket on an axis perpendicular to the bar, a tension arm extending laterally from the bar and having a rim gripping hook on its extended end and its inner end mounted on the support element for longitudinal adjustment of the arm to vary the distance of lateral extension of the hook, a lever arm mounted on the support element, spring means interconnecting the lever arm and bracket to urge the tension bar about said axis in a direction away from the work head, and stop means carried by the support element and engageable with the bracket to prohibit movement of the tension bar in such direction beyond a point where it extends at substantially a right angle to the bar.

References Cited in the file of this patent

UNITED STATES PATENTS

| | | |
|---|---|---|
| 1,307,131 | Kimbel | June 17, 1919 |
| 2,273,340 | Van Zale | Feb. 17, 1942 |